United States Patent
Eizenberg et al.

(10) Patent No.: US 9,100,312 B1
(45) Date of Patent: Aug. 4, 2015

(54) BEST-EFFORT CLIENT RATE LIMITER

(71) Applicant: MARVELL ISRAEL (M.I.S.L) LTD., Yokneam (IL)

(72) Inventors: Ofer Eizenberg, Binyamina (IL); Amir Bishara, Tel-Aviv Jaffa (IL)

(73) Assignee: MARVELL ISRAEL (M.I.S.L.) LTD., Yokneam (IL)

( * ) Notice: Subject to any disclaimer, the term of this patent is extended or adjusted under 35 U.S.C. 154(b) by 69 days.

(21) Appl. No.: 13/667,195

(22) Filed: Nov. 2, 2012

Related U.S. Application Data (60) Provisional application No. 61/605,456, filed on Mar. 1, 2012, provisional application No. 61/594,555, filed on Feb. 3, 2012, provisional application No. 61/554,916, filed on Nov. 2, 2011.

(51) Int. Cl.
*H04L 1/00* (2006.01)
*H04L 12/801* (2013.01)

(52) U.S. Cl.
CPC .................................... *H04L 47/10* (2013.01)

(58) Field of Classification Search
CPC ....... H04L 47/10; H04L 47/35; H04L 47/215; H04L 5/0053; H04L 12/5602; H04L 49/90
USPC ......... 370/235, 412, 230, 232, 229, 236, 252, 370/253, 395.4, 401
See application file for complete search history.

(56) References Cited

U.S. PATENT DOCUMENTS

| | | | | |
|---|---|---|---|---|
| 7,149,184 | B2 * | 12/2006 | Takada et al. | 370/230 |
| 7,936,770 | B1 * | 5/2011 | Frattura et al. | 370/412 |
| 8,014,281 | B1 * | 9/2011 | Lim et al. | 370/230 |
| 8,593,969 | B1 * | 11/2013 | Kondapalli et al. | 370/235.1 |

\* cited by examiner

*Primary Examiner* — Chi H Pham
*Assistant Examiner* — Alexander O Boakye (57) ABSTRACT

A network device which controls the flow of packets from a best-effort client is provided. The network device includes a flow controller which transmits transaction messages between the best effort client and an arbiter, and an average rate monitor which comprises a counter which increments at an amount of $(x-1)$ when a transaction occurrence is detected by the average rate monitor, and decrements at an amount of 1 per cycle when a transaction occurrence is not detected by the average rate monitor. The best-effort client is only given a grant by the arbiter when the counter has a value of zero.

20 Claims, 6 Drawing Sheets

BEST-EFFORT CLIENT RATE LIMITER

CROSS-REFERENCE TO RELATED APPLICATION

The present invention claims priority from U.S. Provisional Patent Application No. 61/554,916 filed Nov. 2, 2011, U.S. Provisional Application No. 61/594,555 filed Feb. 3, 2011, and also from U.S. Provisional Patent Application No. 61/605,456 filed on Mar. 1, 2012, the disclosures of all of which are incorporated herein in their entirety by reference.

BACKGROUND

1. Field

The current disclosure relates to switching devices and the processing of packets from a plurality of clients, including a best-effort client.

2. Background

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Arbiters are generally used in asynchronous circuits to select an order of access to a shared resource by a plurality of requests received from multiple ports or clients. Moreover, the arbiter prevents multiple operations from occurring at a rate that exceeds the capabilities of the resource. For example, if multiple devices request a resource, such as use of a processor, all at the same time, the arbiter governs both an order by which the devices are granted access to the resource as well as a rate at which the devices are granted access to the resource.

When determining an order for granting requests for a resource, arbiters typically are configured to factor in various considerations such as a priority of a given request, fairness among the devices requesting access to a resource, and the like. In a switching context, for example, packets received on different ports may have a different priority for processing, while processing resources for processing packets received at other ports need to be allocated fairly among the other ports.

SUMMARY

One or more embodiments of the disclosure relate to applying a rate limiter to an arbiter to control the transactions between best-effort ports and other higher priority ports and the arbiter, while keeping a bandwidth of the arbiter within a predetermined level.

According to an embodiment of the application, a best-effort client rate limiter configured to rate limit selected packets input from at least one client among at least two clients, is applied to an arbiter that is coupled to a packet processor which processes packets from the clients.

According to an embodiment of the application, there is provided a best-effort client which includes an average rate monitor configured to output a control signal and a flow controller configured to communicate transaction messages between a best effort client and an arbiter. The flow controller selectively prevents the transaction messages from being communicated between the best effort client and the arbiter based on the control signal.

According to an embodiment of the application, there is provided a network device which includes at least one normal service port and at least one best effort port which communicate respective packets to a packet processor under control of an arbiter. The packet processor has a predetermined maximum input packet rate for receiving packets. The network device also includes a packet rate determination module configured to determine whether communication of one or more best effort packets from the best effort port would cause a rate of packets supplied to the packet processor to exceed the maximum input packet rate, and a rate limiter which is disposed between the best effort port and the arbiter, the rate limiter being configured to rate limit the communication of packets from the best effort port to the packet processor based on a determination of the packet rate determination module that the supply of best effort packets to the packet processor would cause the packet processor to exceed a maximum input packet rate.

According to another embodiment of the application, there is provided a network device which includes a flow controller configured to transmit transaction messages between a best effort client and an arbiter, and an average rate monitor which comprises a counter configured to receive transaction occurrences from the arbiter and count up at an amount of (x−1) in response to an indication of the presence of a transaction occurrence, and count down at an amount of 1 per clock cycle, in response to an absence of a transaction occurrence, where x is a minimal average period between transaction start times. The best-effort client is granted a request when the counter has a value of zero.

According to another embodiment of the application, there is provided a method of controlling the flow of packets from a best effort client to a packet processor, the method comprising receiving, by a flow controller, transaction messages between the best effort client and an arbiter, receiving, by an average rate monitor, transaction occurrences from the arbiter and incrementing a counter by an amount of (x−1) if a transaction occurrence is detected, and decrementing the counter at an amount of 1 per clock cycle, if a transaction occurrence is not detected. The packets are transmitted from the best-effort client to the packet processor when the counter has a value of zero.

DETAILED DESCRIPTION

Embodiments will be described below in more detail with reference to the accompanying drawings. The following detailed descriptions are provided to assist the reader in gaining a comprehensive understanding of the methods, apparatuses, and/or systems described herein, and equivalent modifications. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The terms used in the description are intended to describe embodiments only, and shall by no means be restrictive. Unless clearly used otherwise, expressions in a singular form include a meaning of a plural form. In the present disclosure, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Figure 1:
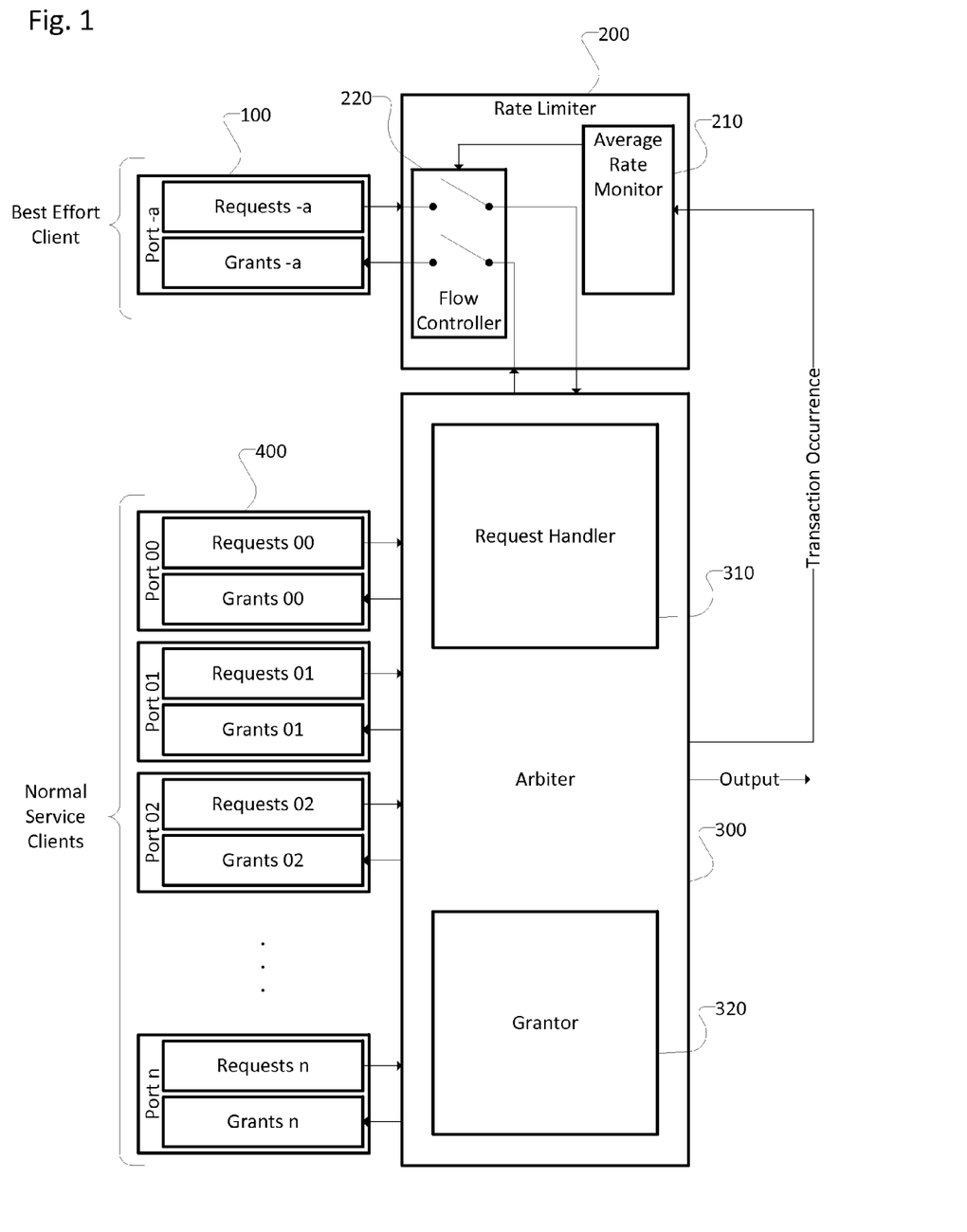
FIG. 1 illustrates a network device for use on a communications network according to an embodiment.

FIG. 1 illustrates a network device for use in a communication network according to an embodiment of the disclosure. The communication network includes a best-effort client port 100, a best-effort client rate limiter 200, an arbiter (or arbitrator) 300, and at least one normal service client 400. In this example, the normal service client 400 is a port. For the sake of convenience, the normal service clients are labeled Port 00, Port 01, . . . Port n. Each port is depicted as having a queue for requests to be provided to the arbiter 300. In addition, each port is depicted as also having a queue for grants received from the arbiter 300. These details are provided for the sake of explanation only, and not by way of limitation. The normal service client 400 is typically connected to a data network such as the Internet or the like.

The best-effort client 100 is also a port with a respective request queue, and a respective grants queue. The best-effort client 100 is different from a normal service client 400 in that it is not intended to be connected to a data network such as the Internet; instead, the best-effort client is meant to be used for internal management. An example of the use of a best-effort client 100 for internal management is the use of a port as a loop-back port. In such a role, best-effort client 100 can be set up so as to return packets, that have had an outer header stripped, to the pipeline for additional processing In this manner, an inner header can be processed during a second pass through the pipeline.

The best-effort client rate limiter 200 includes a flow controller 220, and an average rate monitor 210 coupled together as seen in an embodiment illustrated in FIG. 1.

In the embodiment shown in FIG. 1, the flow controller 220 of the best-effort client rate limiter 200 is configured to communicate transaction messages between the best-effort client 100 and the arbiter 300. As shown in FIG. 1, the flow controller is further configured to selectively prevent the transactions messages from being communicated between the best effort client 100 and the arbiter 300 based on a control signal output from the average rate monitor 210.

The control signal output from the average rate monitor 210 has a value that is based on transaction occurrence indications received from the arbiter 300. In an embodiment, the average rate monitor 210 selectively prevents the communication of the transaction messages to or from the arbiter 300 on the basis of how often the transaction occurrence indications are received. In an embodiment, the transaction occurrences are counted with a counter, and the average rate monitor 210 outputs a control signal to prevent communication via the flow controller 220 whenever the count exceeds a predetermined threshold.

Returning now to the arbiter 300, as shown in FIG. 1, the best-effort client 100 and the normal service clients 400 output requests to the arbiter 300. The arbiter 300 issues grants in response to the requests. The grants are provided to the normal service clients 400 and, if communication is enabled by the rate limiter 200, to the best-effort client 100.

Figure 2:
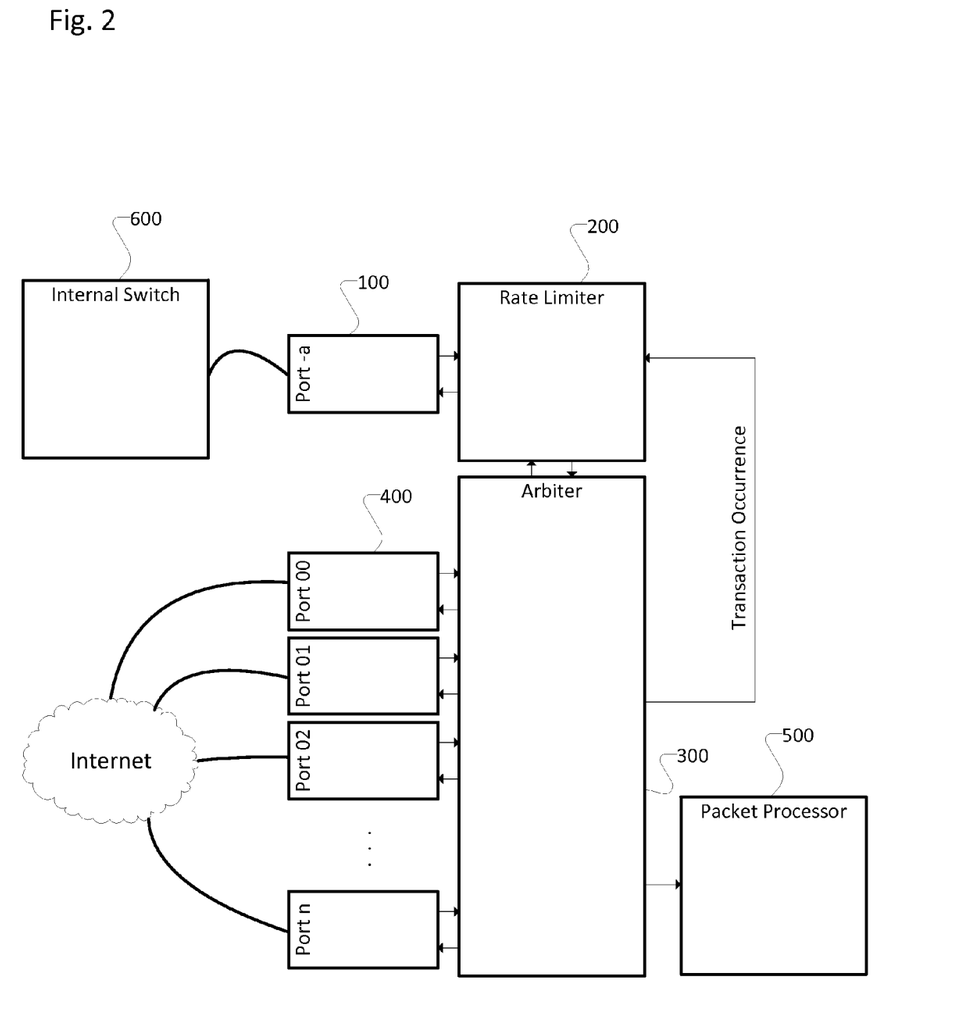
FIG. 2 illustrates another network device for use on a communications network according to another embodiment.

FIG. 2 is similar to FIG. 1, but shows the network device of FIG. 1 in the context of a usage example. In FIG. 2, normal service clients 400 are depicted as being linked to the Internet. This depiction is for the sake of explanation only, to show that normal service clients 400 are used for "real" data traffic that needs to be processed at a rate similar to the rate at which received. Likewise, the best-effort client 100 is depicted as being linked to an internal switch 600 to show that the best-effort client 100 is meant to be used for management-type traffic, or other internal processing such as but not limited to loop back processing, that proceeds on a best effort basis. In addition, the output of the arbiter 300 is depicted as being provided to a packet processor 500. The packet processor 500, in this embodiment, is meant to process packets from ports 00-$n$ and from the port a of the best effort port a.

The grants sent by the arbiter allow the best-effort client 100 and the normal service clients 400 to gain access to a packet processor 500, as illustrated in FIG. 2. The requests that are made by the normal clients and the best-effort client, and the grants, are called transaction messages. The arbiter selects which ports or clients are to provide packets to the packet processor in an operational cycle. Although the embodiment is described in the context of processing packets, in some embodiments, the actual packet is stored in a memory while a descriptor representing the packets is processed through the packet processor. Thus, although the arrangement shown in FIG. 2 should be understood as representing the sending of an actual packet, the discussion is equally applicable to the situation in which a descriptor representing the packets is processed.

To avoid overloading the packet processor 500, the arbiter 300 should limit its output rate to 1/x clocks (here, x is a minimal average period between transaction start times). Furthermore, the arbiter 300 is understood to have N normal service clients, which are guaranteed to have a maximum input rate of 1/x. When handling incoming packets from clients, including a lower priority port such as best-effort client 100, a simplistic approach is to permit the best effort client 100 to send a packet whenever none of the other higher priority normal service clients is requesting that resource.

However, using such a simplistic approach gives the result that, when the request of the lower priority port is granted, the total output rate increases to a rate that is greater than 1/x. It is impermissible to permit the rate to exceed 1/x, however. Accordingly, service on a best effort basis needs to be provided without causing the packet processor 500 to receive packets at a rate which exceeds the maximum average rate.

The average maximum rate of the normal service clients, in accordance with an embodiment, is shown in equation 1:

$$\langle R \rangle_{w=yxi}^{max} = \frac{1}{x[cyc]} \quad \text{(equation 1)}$$

In the equation, R means "rate", "w" is the window in which the rate is conserved and "x" is the number of clocks.

"Best-effort", as described in the current disclosure, means that if any of the normal clients is not requesting access to the packet processor, the best-effort client may send its packets to the packet processor during those periods when no transactions are being processed so long as the maximum average rate is not exceeded. If at the same time another client, for example, one of the normal service clients, is requesting access to the packet processor, the best-effort client will not send its packet or packets until a next cycle, at the earliest. As discussed above, an example of a best-effort port is a loopback port.

In summary, the best-effort client port differs from the normal service client ports in that the normal service client ports have a higher priority than the best-effort client port, and have a minimum guaranteed service rate. The normal service client ports connect, for example, to a network such as the Internet or the like, and are for regular service, while the best-effort client port is a lower priority port, and is for internal use, or maintenance use.

Figure 3:
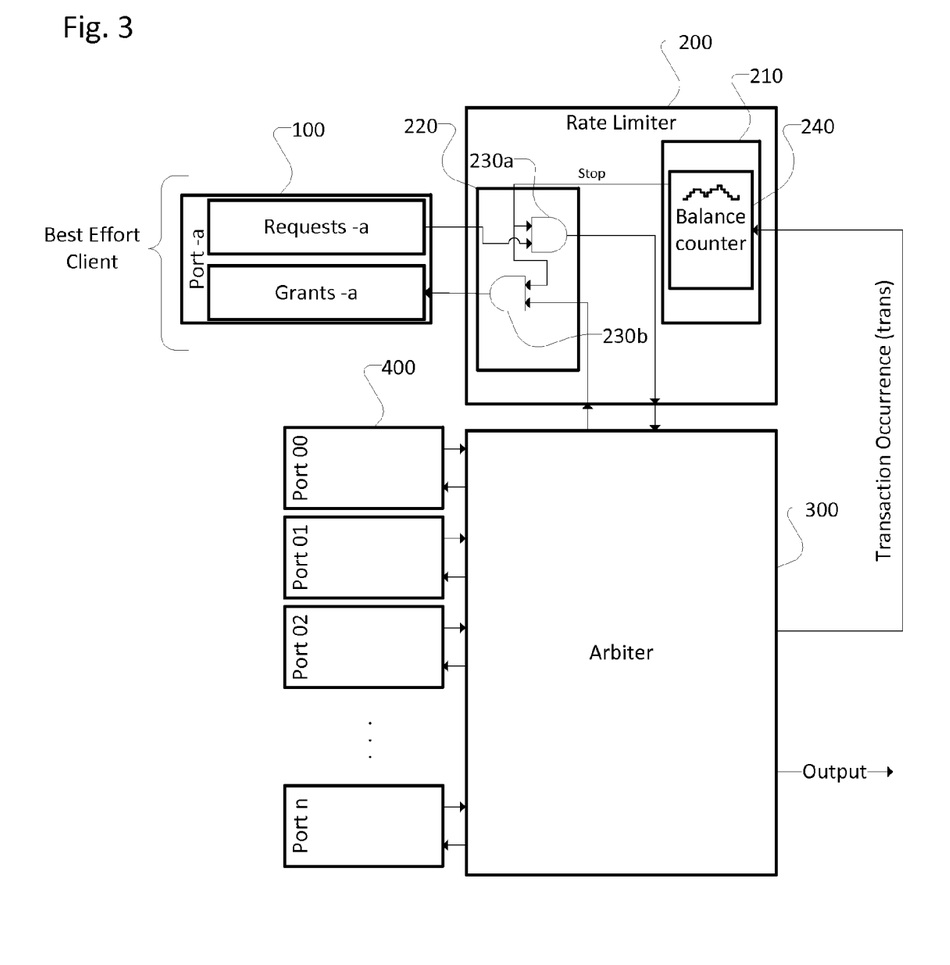
FIG. 3 illustrates a rate limiter employed in a network device according to an embodiment.

FIG. 3 illustrates an implementation of the rate limiter according to an embodiment. The functionalities of the rate limiter are provided by a suitable combination of hardware and software elements. In the rate limiter shown in FIG. 3, the average rate monitor 210 includes a balance counter 240, and the flow controller 220 includes AND gates 230a and 230b.

The balance counter 240 generates a stop signal, which constitutes the control signal of the average rate monitor 210.

The AND gate 230a is configured to have two input signals. The first input signal of AND gate 230a is the stop signal, and the second input signal of AND gate 230a is the request queue of the best effort client 100. The output of AND gate 230a is provided to the request handler 310 of arbiter 300.

The AND gate 230b is configured to have two input signals. The first input signal is the stop signal, and the second input signal of AND gate 230b is the output of the grantor 320 of arbiter 300. The output of AND gate 230b is provided to the grant queue of the best effort client 100.

By setting the stop signal to the appropriate level, the average rate monitor 210, including a balance counter 240 in an embodiment, can therefore selectively enable or disable AND gates 230a and 230b. Enabling AND gate 230a permits requests from the request queue of best effort client 100 to be provided to the request handler 310 of arbiter 300. Disabling AND gate 230a prevents requests of the best effort client 100 from being passed on to the arbiter 300. Similarly, enabling AND gate 230b permits grants from grantor 320 of arbiter 300 to reach the grants queue of the best effort client 100; disabling AND gate 230b prevents grants of the arbiter 300 from being passed on to the best effort client 100.

The balance counter 240 of the average rate monitor 210 provides the basis upon which the level of the stop signal is set. More specifically, the count of the balance counter 240 is raised or lowered based on whether or not a transaction occurrence indicator is received. A transaction occurrence indicator is simply an indication that some transaction has taken place between any client and the arbiter. For example, when any client is granted permission to provide a packet to the packet processor 500, this constitutes a transaction. An indication of the occurrence of a transaction is output by the arbiter and received by the rate limiter 200.

The manner of determining the level of the stop signal will now be described. In particular, whenever a transaction occurrence indication (trans) is received by the average rate monitor 210, the balance counter 240 increments its count. The amount of the increment is determined, in one embodiment, in accordance with equation 2:

$$\text{increment} = x - 1 \quad \text{(equation 2)}$$

In equation 2, x is a minimal average period between transaction start times. Thus, if an arbiter 300 requires a minimal average period of three clock cycles to between transaction start times, the amount of the increment is 3−1=2 cycles. In other words, each time a trans indication is received by the average rate monitor 210, the count of the balance counter 240 is incremented by 2. Similarly, if an arbiter 300 requires two clock cycles to manage a transaction message, the amount of the increment is 2−1=1 cycle. That is to say, each time a trans indication is received, the count of the balance counter 240 is incremented by 1. so as to be (x−1), and if a transfer signal is not received, the counter decrements, or counts down by a count of 1.

Therefore, the count of the balance counter 240 is incremented by the amount indicated in equation 2 each time a transaction occurrence is detected.

The count of the balance counter 240 is decremented, as well. In particular, the amount by which the count of the balance counter 240 is decremented is fixed at 1 in an embodiment. The decrement is carried out whenever no transaction is detected. That is to say, the count is counted down at an amount of 1 whenever there is an absence of a transaction occurrence.

By using the balance counter 240, it is possible to take into account an average rate of transactions when determining whether to grant a resource such as a packet processor 500 to a best-effort client 100. To implement this, the average rate monitor 210 of rate limiter 200 outputs a stop signal whenever the count of the balance exceeds a predetermined threshold. In an embodiment, the predetermined threshold is zero. That is to say, whenever the count is more than zero, the best effort client 100 is not permitted to communicate with the arbiter 300. Whenever the count is zero, the best effort client 100 is permitted to communicate with the arbiter 300.

To summarize, when a transaction occurrence is indicated to the average rate monitor 210, the balance counter 240 of the average rate monitor 210 is incremented by (x−1). Whenever the balance counter 240 has a count of greater than the predetermined threshold of zero, the average rate monitor outputs the stop signal. The stop signal disables both AND gate 230a and 230b, thereby preventing communications between the best effort client 100 and the arbiter 300. Likewise, whenever there is an absence of a transaction occurrence, the balance counter 240 of the average rate monitor 210 is decremented by 1. Whenever the balance counter 240 has a count of zero, the average rate monitor ceases to output the stop signal and outputs a signal that permits AND gates 230a and 230b to enable communication between the best effort client 100 and the arbiter 300.

Although FIG. 3 shows the stop signal being output from the balance counter 240, this arrangement may be modified. In particular, a specific block (not seen) may be developed to output the stop signal based on the count.

It is noted that the packet processor has a maximum operational rate for processing packets. Accordingly, the rate limiter limits the output rate to the packet processor to 1/x clocks. Since the N regular or high priority clients are guaranteed to have a maximum total of 1/x mean input rate, the best-effort client or lower priority client is only given access to the packet processor if none of the other clients are requesting resources, and only if such access does not result in an overload of the packet processor, namely, does not result in exceeding the maximum output mean output rate.

The mean output rate is defined in Equation 3:

$$\text{Mean output rate} = \frac{\text{Active signal count}}{\text{Clock count}}. \quad \text{(equation 3)}$$

Accordingly, since grants are not given to the best-effort client by the arbiter until the counter of the balance counter is decremented to zero, the servicing of the requests from the best-effort client cannot cause the prescribed bandwidth of the packet processor to be exceeded.

Figure 4:
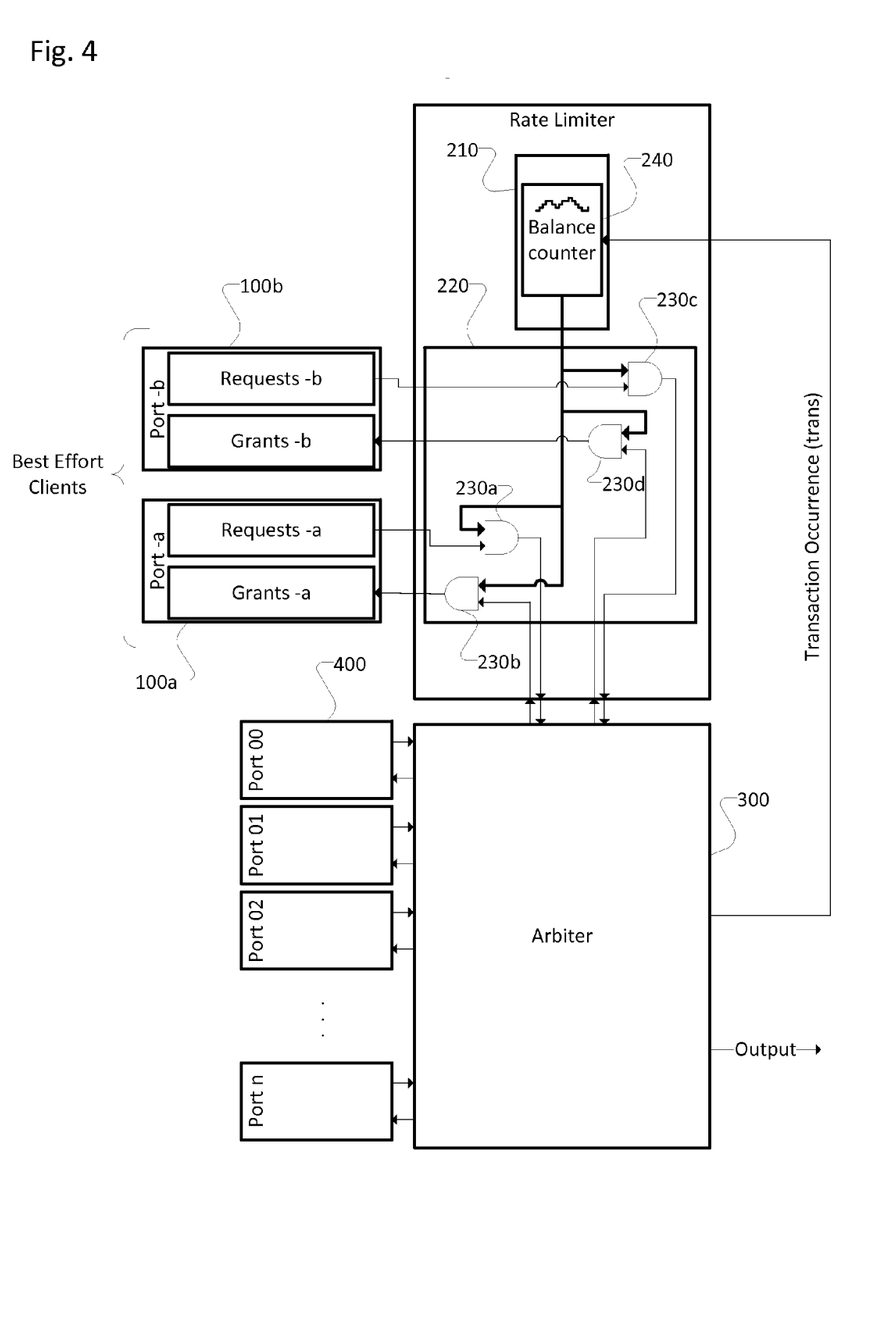
FIG. 4 illustrates an extension of the rate limiter employed in a network device as shown in FIG. 3.

FIG. 4 illustrates an implementation of the rate limiter according to an embodiment. FIG. 4 illustrates a rate limiter which supports two or more best-effort clients. The stop signal that is output from the balance counter 240 is provided to an input of a first AND gate 230a of a first best-effort client 100a, a first input of a second AND gate 230b of the first best-effort client 100a, a first input of a first AND gate 230c of the second best-effort client 100b and a first input of a second AND gate 230d of the second best-effort client 100b. Outputs of the first AND gate 230a of the first best-effort client and the first AND gate 230c of the second best-effort client are connected to the arbiter. The output of the second AND gate 230b of the first best-effort client, and the output of the second AND gate 230d of the second best-effort client respectively transmit acknowledgements to the first and second best-effort clients 100a and 100b.

In FIG. 4, two best-effort clients 100a and 100b are shown, but more best effort clients can be implemented in such a manner.

Figure 5:
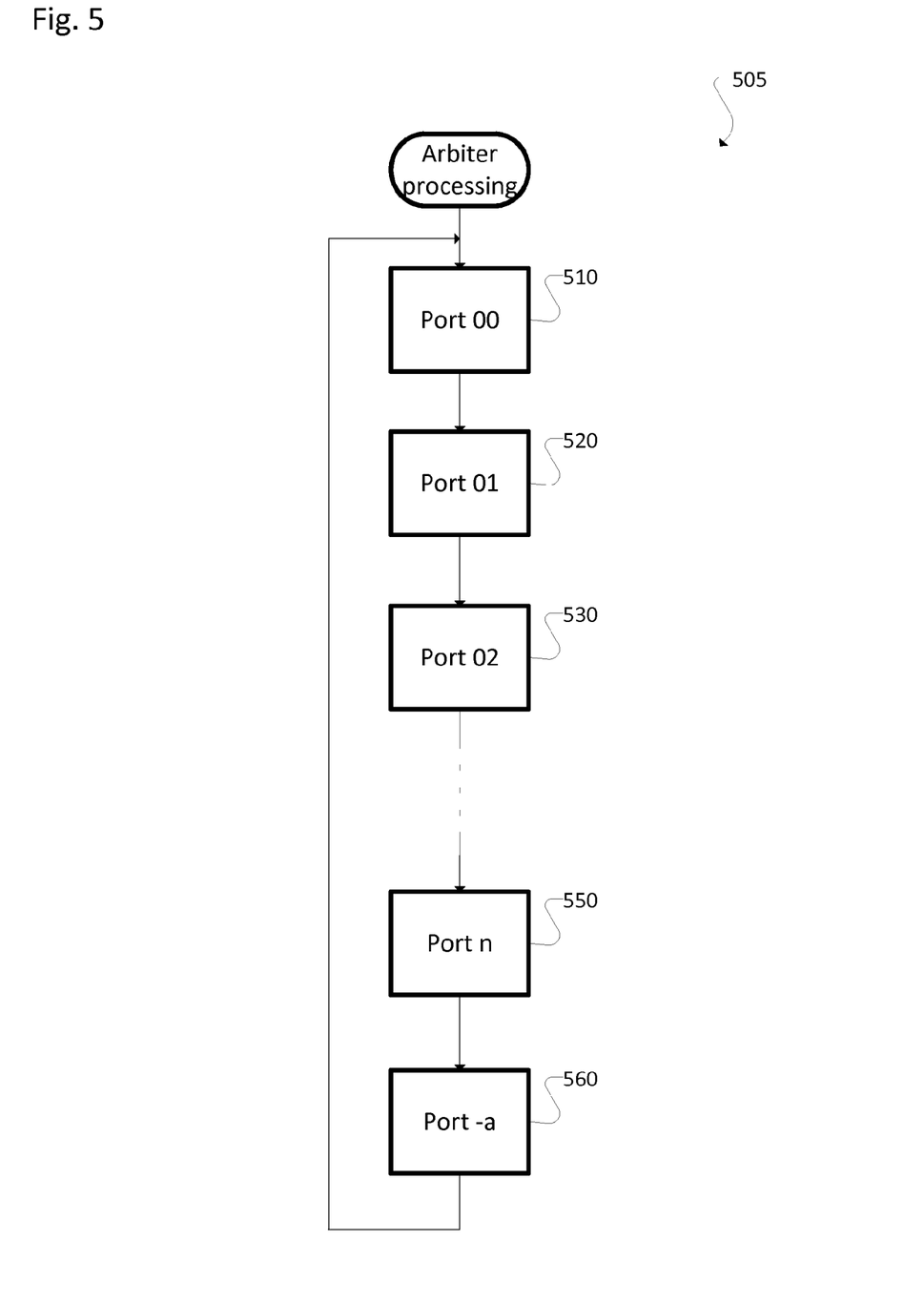
FIG. 5 is a flowchart that depicts arbiter processing according to an embodiment.

FIG. 5 illustrates arbiter processing according to an embodiment. In FIG. 5, 505 indicates a manner in which an arbiter 300 examines the request queue of each client in turn. More specifically, at 510 the arbiter 300 checks the request queue of port 00 and initiates any processing appropriate to the state of the queue using request handler 310 and grantor 520. At 520 the arbiter 300 checks the request queue of port 01 and initiates any processing appropriate to the state of the queue of port 01. The processing continues with each normal service client port up through port n having its turn, followed by best effort client 100. In FIG. 5, at 560, only one best effort client port is shown. Any other best effort client ports would have a turn following 560. After the arbiter 300 has given each client a turn, processing returns to 510. It will be understood that the particular flow illustrated in FIG. 5 is presented for the sake of explanation only, and is not meant to be limitative.

Figure 6:
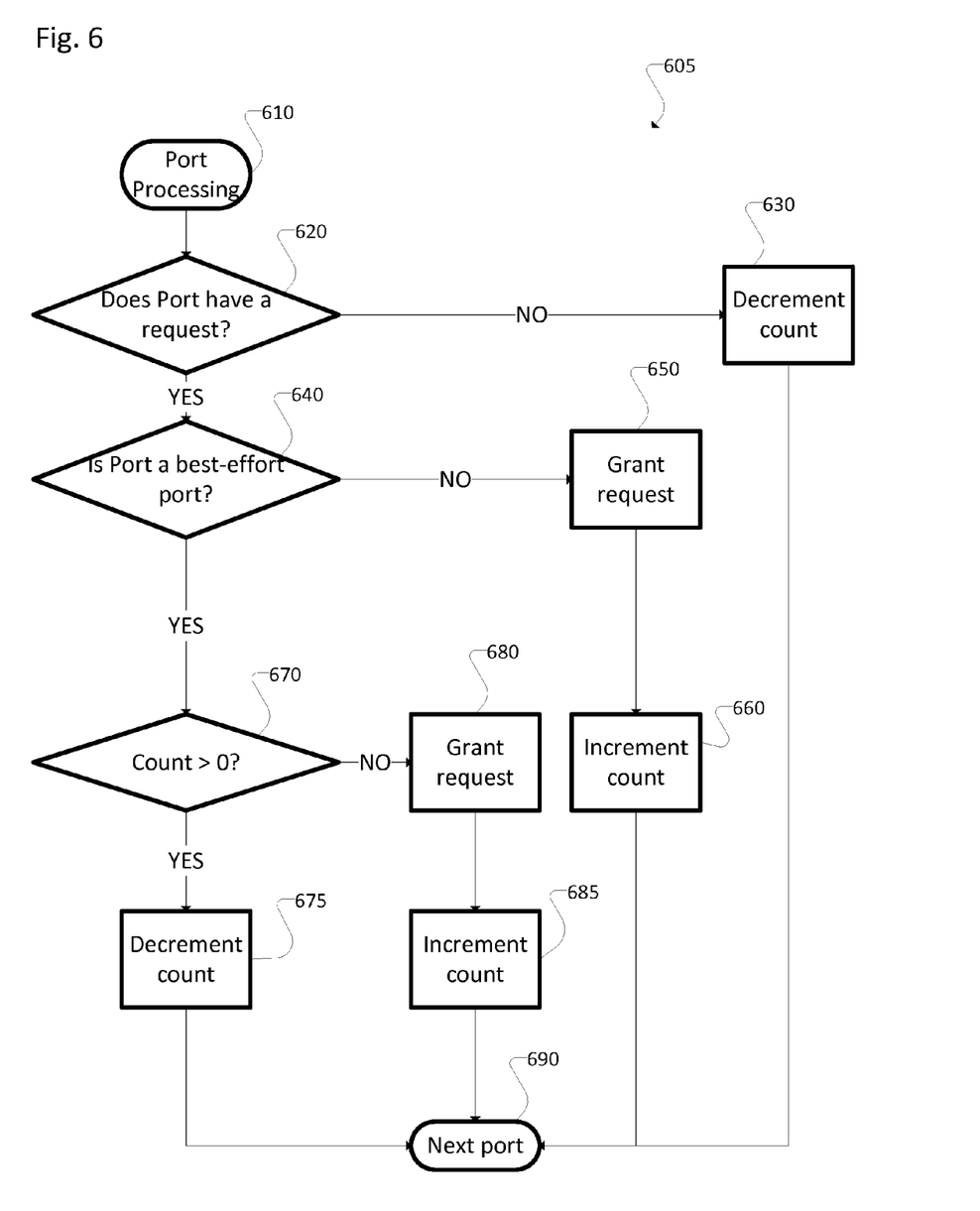
FIG. 6 is a flowchart that illustrates a flow of processing of an embodiment.

FIG. 6 illustrates a flowchart of the system according to an embodiment.

Illustrated in FIG. 6 is an example of what processing may take place when an arbiter 300 receives inputs from at least one normal service client port 400 and a best-effort client port 100. It will be understood that FIG. 6 illustrates the processing effected by implementing rate limiter 200 and arbiter 300 as shown and described above. In other words, FIG. 6 is intended to present a logical flow for the sake of explanation.

When a transaction occurrence is detected, a port processing procedure 605 is undertaken. From FIG. 5, it is understood that each port is given a turn by the arbiter 300. The procedure 605 may be understood to be the effect of including the rate limiter 200 between the best effort client 100 and the arbiter 300.

In 610, processing begins and any initialization is carried out. In 620, a determination is made as to whether a port, which has its turn, has a request. If yes, processing continues with 640; if no, processing continues to 630 where the count of the counter 240 is decremented by 1. After the count is decremented in 630, processing for the port ends at 690 and another port is given a turn.

In 640, after it has been determined that a port has a request, processing depends on whether the port is a best-effort client or a normal service client. If the port is a normal service client, processing moves to 650 where the request is immediately granted, and then to 660 where the count is incremented. In an embodiment, the increment is x−1.

If, at 640, the port is a best effort client, processing continues to 670. At 670, a determination is made as to whether the count exceeds the predetermined threshold. In this embodiment, the threshold is zero. Where the count of the balance counter 240 is not greater than the threshold, processing continues with 680 where the request from the best-effort client port is granted. After the request is granted, the count of the counter is incremented by x−1 at 685.

On the other hand, if the count in 670 exceeds the threshold, the request is not granted and processing continues to 675 with the count being decremented by 1. Processing thereafter continues with 690. The import of this example should be noted: even though an idle or dead cycle is detected, the use of the count of the counter 240 prevents the best-effort client from being given access to such a cycle when the count is greater than zero. Thus, some dead cycles are permitted so that the overall maximum input packet rate is not exceeded.

To put this another way, the rate limiter 200 includes an average rate monitor 210 which makes a determination, using the counter, as to whether the communication of a best effort client port would result in exceeding a predetermined maximum input packet rate. This determination is simplified by the use of the counter to a simple comparison with a predetermined threshold.

FIG. 6 is for use as a teaching example. The order shown in FIG. 6 is not the only manner in which the port processing may be performed.

Although the inventive concept has been described above with respect to the various embodiments, it is noted that there can be a variety of permutations and modifications of the described features by those who are familiar with this field, without departing from the technical ideas and scope of the features, which shall be defined by the appended claims.

While this specification contains many features, the features should not be construed as limitations on the scope of the disclosure or of the appended claims. Certain features described in the context of separate embodiments can also be implemented in combination. Conversely, various features described in the context of a single embodiment can also be implemented in multiple embodiments separately or in any suitable subcombination.

Although the drawings describe the operations in a specific order, one should not interpret that the operations are performed in a specific order as shown in the drawings or successively performed in a continuous order, or all the operations are performed to obtain a desired result. Multitasking or parallel processing may be advantageous under any environment.

A number of examples have been described above. Nevertheless, it is noted that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A best effort client rate limiter apparatus, comprising:
   an average rate monitor, the average rate monitor comprising a counter configured to regulate a count value based on a transaction occurrence between an arbiter configured to grant access to a shared resource and one of a plurality of normal clients, the average rate monitor being configured to output a control signal based on the count value of the counter; and
   a flow controller configured to regulate a flow of transaction messages between the arbiter and a best effort client, the best effort client having a lower priority access to the shared resource than the plurality of normal clients;

the flow controller being further configured to selectively prevent the flow of the transaction messages between the best effort client and the arbiter based on the control signal, the control signal including an indication that the count value of the counter exceeds a predetermined threshold.

2. The rate limiter as set forth in claim 1, wherein:

the counter is configured to increase the count value in response to an indication that a transaction occurred between the arbiter and one of the plurality of normal clients.

3. The rate limiter as set forth in claim 1, wherein the counter of the average rate monitor is configured to increase or decrease the count value in response to a presence or an absence of an indication that a transaction occurred between the arbiter and one of the plurality of clients.

4. The rate limiter as set forth in claim 3, wherein the counter is configured to decrease by 1 per clock cycle in which the transaction occurrence indication is absent.

5. The rate limiter as set forth in claim 2, wherein the count value of the counter is decremented by an amount of 1, in response to an absence of an indication that a transaction occurred between the arbiter and one of the plurality of clients, until the count value reaches the predetermined threshold value of zero.

6. The rate limiter as set forth in claim 2, wherein the count value of the counter is increased by an amount x−1, in response to a presence of an indication that a transaction occurred between the arbiter and one of the plurality of clients, where x is a minimal average period between start times of a first transaction and a second transaction.

7. The rate limiter as set forth in claim 1, wherein the flow controller comprises an AND gate and is configured to receive the control signal of the average rate monitor as a first input, receive a best effort client request line as a second input, and control the flow of the transaction messages between the best-effort client and the arbiter.

8. The rate limiter as set forth in claim 1, wherein the flow controller comprises an AND gate and is configured to receive the control signal of the average rate monitor as a first input and to receive an arbiter grant line as a second input, and control the flow of the transaction messages between the best-effort client and the arbiter.

9. A network device, comprising:

at least one normal service port and at least one best effort port communicating respective packets to a packet processor governed by an arbiter; wherein the packet processor has a predetermined maximum input packet rate for receiving packets;

a packet rate determination module configured to determine whether communication of one or more best effort packets from the best effort port would cause a rate of packets supplied to the packet processor to exceed the maximum input packet rate, and a rate limiter disposed between the best effort port and the arbiter, the rate limiter being configured to rate limit the communication of packets from the best effort port to the packet processor based on a determination of the packet rate determination module that the supply of best effort packets to the packet processor would cause the packet processor to exceed a maximum input packet rate.

10. The network device as set forth in claim 9, wherein the rate limiter further comprises:

an average rate monitor configured to output a control signal to control the flow controller based on an occurrence of a transaction; and a flow controller configured to communicate transaction messages between the best effort port and the arbiter;

the flow controller being further configured to prevent the communication of a given best effort port packet by preventing the transaction messages from being communicated between the best effort port and the arbiter when a count of a counter of the rate limiter exceeds a predetermined threshold.

11. The network device as set forth in claim 10, wherein:

the average rate monitor further comprises a counter which increases or decreases in response to the absence of presence of a transaction occurrence indication; and the average rate monitor being configured to make the determination that the communication of the given best effort port packet would result in exceeding the predetermined maximum input packet rate when the counter exceeds the predetermined threshold.

12. The network device as set forth in claim 11, wherein the counter of the average rate monitor is configured to decrease in response to an absence of a transaction occurrence indication and increase in response to a presence of a transaction occurrence.

13. The network device as set forth in claim 12, wherein the counter is configured to decrease by 1 per clock cycle in which there is an absence of a transaction occurrence indication.

14. The network device as set forth in claim 11, further comprising a balance counter which is configured to decrement by an amount of 1 to a threshold number having a positive value.

15. The network device as set forth in claim 11, wherein the counter is configured to be increase by the average rate monitor, in response to the transaction occurrence indication by an amount x−1, where x is a minimal average period between transaction start times.

16. The network device as set forth in claim 12, wherein the flow controller comprises an AND gate and is configured to receive the control signal of the average rate monitor as a first input and a best effort port request line as a second input.

17. The network device as set forth in claim 12, wherein the flow controller comprises an AND gate and is configured to receive the control signal of the average rate monitor as a first input and an arbiter grant line as a second input.

18. The network device as set forth in claim 10, further comprising a second best effort port, wherein:

the flow controller is configured to communicate transaction messages between the second best effort port and the arbiter; and the flow controller is configured to prevent the transaction messages from being communicated between the second best effort port and the arbiter based on the control signal.

19. A network device comprising:

a flow controller configured to transmit transaction messages between a best effort client and an arbiter, and an average rate monitor which comprises a counter configured to receive transaction occurrences from the arbiter and count up at an amount of (x−1) in response to an indication of the presence of a transaction occurrence, and count down at an amount of 1 per clock cycle, in response to an absence of a transaction occurrence, wherein x is a minimal average period between transaction start times, and wherein the arbiter grants a request by the best-effort client to receive a resource when the counter has a value of zero.

20. A method of controlling the flow of packets from a best effort client to a packet processor, the method comprising:
    receiving, by a flow controller, transaction messages that are sent between the best effort client and an arbiter;
    receiving, by an average rate monitor, transaction occurrences from the arbiter and incrementing a counter by an amount of (x−1) if a transaction occurrence is detected, and decrementing the counter at an amount of 1 per clock cycle, if a transaction occurrence is not detected,
    wherein "x" is a minimal average period between transaction start times, and
    wherein packets are transmitted from the best-effort client to the packet processor when the counter has a value of zero.

* * * * *